(12) United States Patent
Coffield

(10) Patent No.: US 9,131,776 B2
(45) Date of Patent: Sep. 15, 2015

(54) MOLDED LOAD BEARING SURFACE AND METHOD OF MANUFACTURE

(75) Inventor: Timothy P. Coffield, Grand Rapids, MI (US)

(73) Assignee: Illinois Tool Works Inc., Glenview, IL (US)

( * ) Notice: Subject to any disclaimer, the term of this patent is extended or adjusted under 35 U.S.C. 154(b) by 1014 days.

(21) Appl. No.: 13/255,743

(22) PCT Filed: Feb. 9, 2010

(86) PCT No.: PCT/US2010/023576
§ 371 (c)(1),
(2), (4) Date: Sep. 9, 2011

(87) PCT Pub. No.: WO2010/104636
PCT Pub. Date: Sep. 16, 2010

(65) Prior Publication Data
US 2012/0018607 A1    Jan. 26, 2012

Related U.S. Application Data

(60) Provisional application No. 61/158,982, filed on Mar. 10, 2009.

(51) Int. Cl.
| | |
|---|---|
| A47C 23/00 | (2006.01) |
| A47C 7/28 | (2006.01) |
| A47C 7/14 | (2006.01) |
| B29C 45/00 | (2006.01) |
| B29C 45/14 | (2006.01) |
| B29L 31/44 | (2006.01) |

(52) U.S. Cl.
CPC . *A47C 7/287* (2013.01); *A47C 7/14* (2013.01); *A47C 7/282* (2013.01); *B29C 45/0062* (2013.01); *B29C 45/14311* (2013.01); *B29C 45/14336* (2013.01); *B29L 2031/443* (2013.01)

(58) Field of Classification Search
CPC .............. B29C 45/14311; B29C 45/14336; B29C 45/0062; B29L 2031/443; A47C 7/287; A47C 7/14; A47C 7/282
USPC .............. 297/284.4, 440.11, 452.15, 452.56; 267/142, 143; 5/653; 296/65.02; 428/212, 221
See application file for complete search history.

(56) References Cited

U.S. PATENT DOCUMENTS 3,174,741 A * 3/1965 Wolff ............................. 267/110
3,208,085 A * 9/1965 Grimshaw .................... 5/655.9
(Continued)

FOREIGN PATENT DOCUMENTS

| CN | 201167736 Y | 12/2008 |
|---|---|---|
| WO | 2009055252 A1 | 4/2009 |

OTHER PUBLICATIONS

ISR for PCT/US2010/023576 dated Aug. 26, 2010.

*Primary Examiner* — Gwendolyn W Baxter

(57) ABSTRACT

A load bearing surface assembly has an oriented, molded load bearing surface intersecured with a relatively rigid orienting member. The characteristics of the orienting member are selected such that the orienting member provides a rigid edge member for holding the load bearing surface during the orienting process and/or for mounting the load bearing surface to a support structure. A pair of orienting members are mounted to opposed edges of the load bearing surface. The load bearing surface may be integrally molded into a unitary construction with the orienting member(s). Methods for manufacturing a load bearing surface having an orienting member and a load bearing surface assembly with a load bearing surface and an orienting member are also disclosed.

19 Claims, 14 Drawing Sheets

(56) References Cited

U.S. PATENT DOCUMENTS

| | | | |
|---|---|---|---|
| 3,502,316 A * | 3/1970 | Saether | 267/110 |
| 5,009,827 A * | 4/1991 | Abu-Isa et al. | 264/156 |
| 6,113,082 A * | 9/2000 | Fujino | 267/103 |
| 8,465,007 B2 * | 6/2013 | Coffield et al. | 267/142 |
| 2003/0001424 A1 * | 1/2003 | Mundell et al. | 297/452.56 |
| 2006/0267258 A1 | 11/2006 | Coffield et al. | |
| 2008/0164744 A1 | 7/2008 | Wang | |

* cited by examiner

MOLDED LOAD BEARING SURFACE AND METHOD OF MANUFACTURE

CROSS REFERENCE TO RELATED APPLICATION

This application is national phase of PCT/US2010/023576 filed Feb. 9, 2010, and claims the benefit of U.S. Provisional Application No. 61/158,982, filed Mar. 10, 2009.

FIELD OF THE INVENTION

The present invention relates to load bearing surfaces, and more particularly to molded load bearing surfaces, such as the seat or back of a chair or bench, or the support surface of a bed, cot or other similar product.

BACKGROUND OF THE INVENTION

There are continuing efforts to develop new and improved load bearing surfaces. In the context of general load bearing surfaces, the primary objectives of these efforts are to obtain a durable and inexpensive load bearing surface. In the context of seating and other body-support applications, it is also important to address comfort issues. For example, with seating, it can be important to provide a surface that is comfortable and does not create body fatigue over periods of extended use. Given that the load characteristics (e.g. stiffness, resiliency, force/deflection profile) desired in a particular surface will vary from application to application, it is also desirable to have a load bearing surface that is easily tunable for different applications during design and manufacture.

It is known to provide molded load bearing surfaces for a wide variety of applications. For example, molded plastic chairs (e.g. lawn chairs) are available from a variety of well known suppliers. Although these molded chairs provide an inexpensive seating option, they do not provide the level of support and comfort available in more expensive load bearing surfaces, such as conventional cushion sets. Rather, they provide an essentially linear force/deflection profile, which gives the typical molded seating surfaces the feel of a drum or a trampoline. In seating and other body-support applications, this may result in an uncomfortable and sometimes ergonomically unacceptable load bearing surface. Further, the ability to tune the characteristics of a conventional molded seat is relatively limited. Different materials and different material thicknesses can be used to provide a limited degree of control over the characteristics of the seat, but this level of control is not sufficient in many applications.

To address the aforementioned limitations of molded loaded bearing surfaces, it is also known to provide molded load bearing surfaces that are oriented after molding to provide the desired load bearing surface characteristics. U.S. Ser. No. 11/423,540, which is entitled LOAD BEARING SURFACE, and was filed on Jun. 12, 2006 by Coffield et al, is incorporated herein by reference in its entirety. Oriented load bearing surfaces have proven to be a marked improvement over the prior art in many ways.

SUMMARY OF THE INVENTION

The present invention provides a load bearing surface assembly having an oriented, molded load bearing surface intersecured with a relatively rigid orienting member. The load bearing surface has elastomeric properties that allow the load bearing surface to flex under anticipated loads. The characteristics of the orienting member are selected such that the orienting member provides a rigid edge member for holding the load bearing surface during the orienting process and/or for mounting the load bearing surface to a support structure, such as a chair seat frame or a chair back frame. In one embodiment, the load bearing surface includes a pair of orienting members mounted to opposed edges of the load bearing surface. The load bearing surface may be integrally molded into a unitary construction with the orienting member(s), for example, by placing the orienting member(s) in the mold cavity prior to molding the load bearing surface.

In one embodiment, the orienting member includes a plurality of interlocking features that provide a mechanical interlock between the load bearing surface and the orienting member(s) during molding of the load bearing surface. In one embodiment, the interlocking features are apertures that are filled with load bearing surface material when the load bearing surface is molded onto the orienting member. The apertures may extend in a direction substantially perpendicular to the direction of the tensile loads on the load bearing surface. The size, shape, location and combined cross-sectional area of the apertures may vary from application to application. In one embodiment, the total projected cross sectional area is roughly equal to or greater than the total maximum tensile loads multiplied by the shear strength of the material used to form the load bearing surface. In one embodiment, the load bearing surface material has a shear strength of 2,000 pounds per square inch.

In a second aspect, the present invention provides a method for manufacturing a load bearing surface with an orienting member including the general steps of: (1) providing an orienting member; (2) placing the orienting member in a mold cavity; (3) molding a load bearing surface onto the orienting member to form a unitary structure; and (4) orienting the load bearing surface with an orienting apparatus, the orienting apparatus mating with and using the orienting member to elongate the load bearing surface. In one embodiment, the load bearing surface is provided with a pair of orienting member disposed on opposed edges. This embodiment includes the general steps of: (1) providing a pair of orienting members; (2) placing the orienting member in a mold cavity at opposed ends of the mold cavity; (3) molding a load bearing surface onto the orienting members to form a unitary structure; and (4) orienting the load bearing surface with an orienting apparatus, the orienting apparatus mating with both orienting members and moving the orienting members away from one another to elongate the load bearing surface.

In a third aspect, the present invention discloses a method for manufacturing and mounting a load bearing surface assembly including the general steps of: (1) providing an orienting member; (2) placing the orienting member in a mold cavity; (3) molding a load bearing surface onto the orienting member to form a unitary structure; (4) orienting the load bearing surface with an orienting apparatus; and (5) mounting the orienting member to a support structure. In one embodiment, the load bearing surface is provided with a pair of orienting member disposed on opposed edges. In this embodiment, the process may include the general steps of: (1) providing a pair of orienting members; (2) placing the orienting members in a mold cavity at opposed ends of the mold cavity; (3) molding a load bearing surface onto the orienting members to form a unitary structure; (4) orienting the load bearing surface with an orienting apparatus; and (5) mounting the orienting members to a support structure. The step of mounting the orienting members may include the steps of mounting the orienting members to a frame and mounting the frame to the support structure.

The present invention provide a simple and effective structure and method that facilitates both manufacture and mounting of oriented, molded load bearing surfaces. The orienting members provide a rigid structure that can be readily mounted to a support structure using snaps, fasteners or other mounting elements. The orienting members also provide the load bearing surface assembly with rigid edge members that can be easily engaged by an orienting apparatus, thereby facilitating orientation of the load bearing surface through elongation. The mechanical interlock between the orienting members and the load bearing surface can be controlled in part through the design and configuration of the interlocking features of the orienting member.

Other features and advantages of the invention will become apparent to those skilled in the art upon review of the following detailed description, claims and drawings in which like numerals are used to designate like features.

Figure 1:
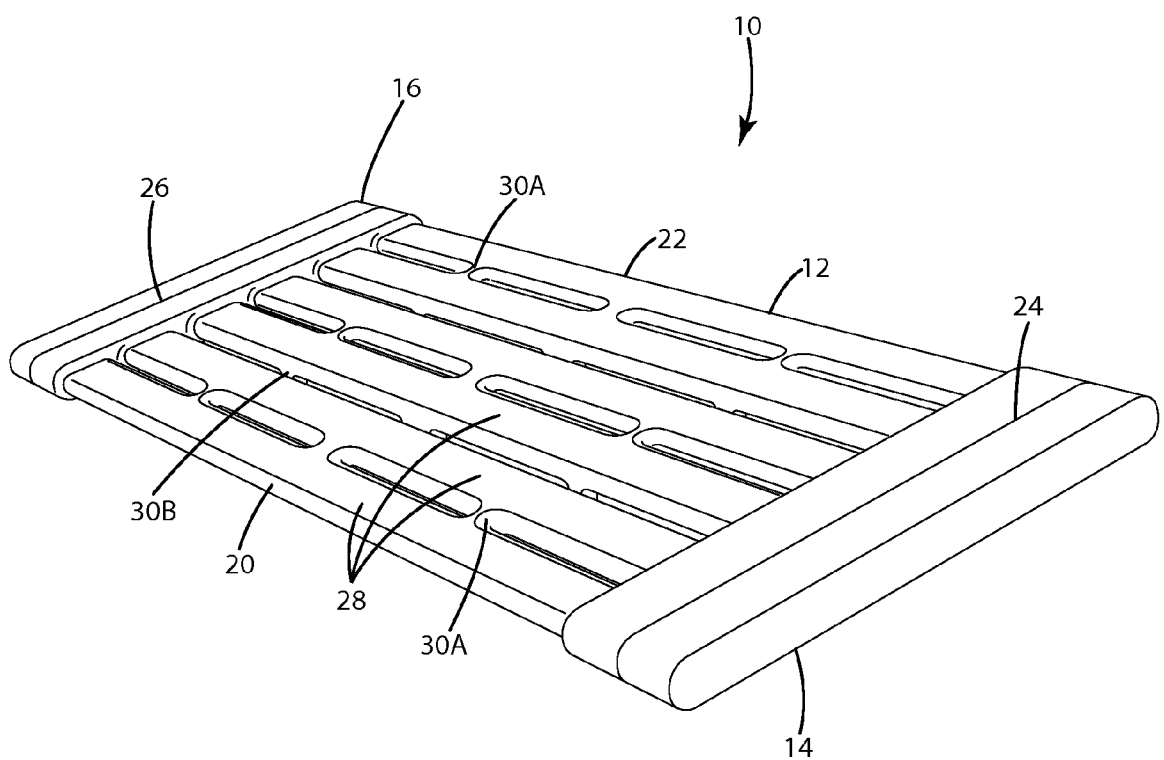
FIG. 1 is a perspective view of a load bearing surface having a pair of orienting members according to an embodiment of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DESCRIPTION OF CURRENT EMBODIMENTS

A load bearing surface assembly 10 in accordance with one embodiment of the present invention is shown in FIG. 1. The load bearing surface assembly 10 generally includes a load bearing surface 12 and a pair of orienting members 14, 16 disposed on opposed edges of the load bearing surface 12. The orienting members 14, 16 provide a rigid edge member that may be used to orient the load bearing surface 12 and/or to mount the load bearing surface 12 to a support structure.

In a second aspect, the present invention discloses a method for manufacturing a load bearing surface assembly including the general steps of: (1) providing a pair of orienting members 14, 16; (2) placing the orienting members 14, 16 in a mold cavity at opposed ends of the mold cavity; (3) molding a load bearing surface 12 onto the orienting members to form a load bearing surface assembly 10; and (4) orienting the load bearing surface 12 with an orienting apparatus (not shown), the orienting apparatus mating with both orienting members 14, 16 and moving the orienting members 14, 16 away from one another to elongate the load bearing surface 12.

In a third aspect, the present invention discloses a method for manufacturing and mounting a load bearing surface assembly including the general steps of: (1) providing a pair of orienting members 14, 16; (2) placing the orienting members 14, 16 in a mold cavity at opposed ends of the mold cavity; (3) molding a load bearing surface 12 onto the orienting members to form a load bearing surface assembly 10; (4) orienting the load bearing surface 12 with an orienting apparatus (not shown); and (5) mounting the orienting members to a support structure. In one embodiment, the orienting step may include the orienting apparatus mating with both orienting members 14, 16 and moving the orienting members 14, 16 away from one another to elongate the load bearing surface 12.

Referring now to FIG. 1, the illustrated load bearing surface assembly 10 is designed to function as the support surface for the seat of a chair or as a portion of the support surface for the seat of a chair. The present invention may, however, be incorporated into essentially any application where a resilient load bearing surface may be desired. In this embodiment, the load bearing surface assembly 10 includes a front edge 20, a back edge 22, a right edge 24 and a left edge 26. Directions terms, such as "front," "back," "left," "right," "top" and "bottom," are used in reference to the physical orientation shown in FIG. 1, and are not intended to limit the present invention to use in applications in which the load bearing surface assembly 10 is disposed in any specific orientation. The load bearing surface 12 includes a plurality of straps 28 that extend generally from the right edge 24 to the left edge 26. The straps 28 may be coupled to one another to different degrees to provide a controlled amount of interdependence between the straps 28 in the front-to-rear direction. For example, the straps 28 may include bridges 30a, 30b that interconnect adjacent the straps 28. The bridges 30a, 30b are shaped and sized to provide the desired amount of coupling between adjacent straps 28. The design and configuration of the bridges may vary from application to application and even from location to location within a single application. Although illustrated in connection with a load bearing surface 12 having a plurality of straps 28, the load bearing surface 12 may have essentially any configuration. For example, the load bearing surface 12 may alternatively be a generally continuous sheet.

In the illustrated embodiment, the orienting members 14, 16 are disposed in opposition to one another along the right edge 24 and the left edge 26, which facilitates orientation of the load bearing surface 12 in the left-right direction and also facilitates mounting of the load bearing surface at its left and right edges. In this embodiment, the tensile loads encountered by the load bearing surface assembly 10 during orienting and after being mounted to a support structure extend in the left-right direction. The orienting members 14, 16 may be located along other edges or edge portions of the load bearing surface, as desired.

Figure 2:
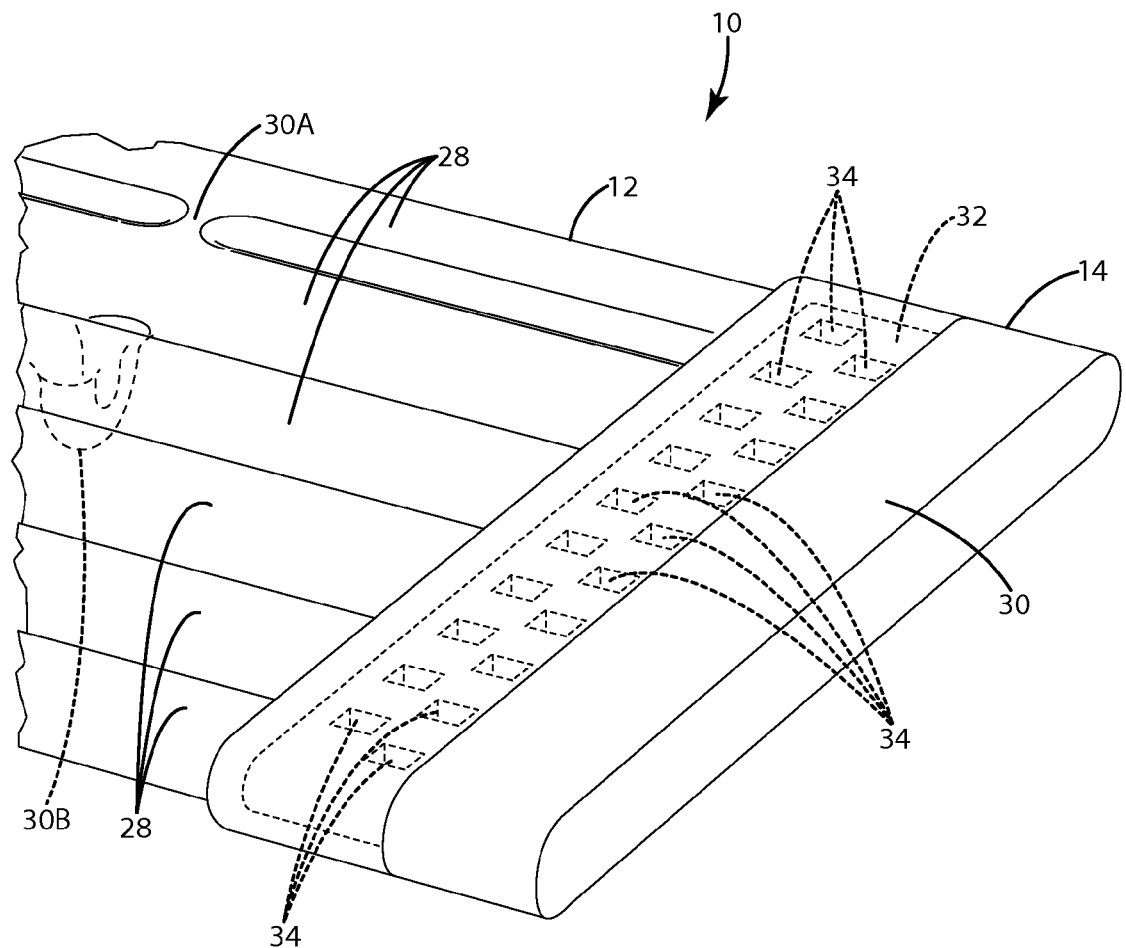
FIG. 2 is an enlarged perspective view of a portion of the load bearing surface with the encapsulated portions of the orienting member visible in hidden lines through the material of the load bearing surface.

FIG. 2 is an enlarged illustration of one end of the load bearing surface assembly 10 showing orienting member 14. In the illustrated embodiment, the orienting members 14, 16 are essentially identical to one another. This is not, however, necessary and the orienting members may vary from one another. Given that they are essentially the same, the two orienting members 14, 16 will be described by reference primarily to orienting member 14. Orienting member 14 generally includes a head 30 and a projection 32. The head 30 is exposed and may include contours or other features (not shown) intended to facilitate mating with an orienting machine for orienting purposes or connection to a support structure to support the load bearing surface during end use. For example, the head 30 may define screw or other fastener holes (not shown) for mounting the head using screws or other fasteners. As another example, the head 30 may define include snap details (not shown) that allow the head 30 to be snap-fitted onto an orienting machine and/or a support structure.

Figure 3A:
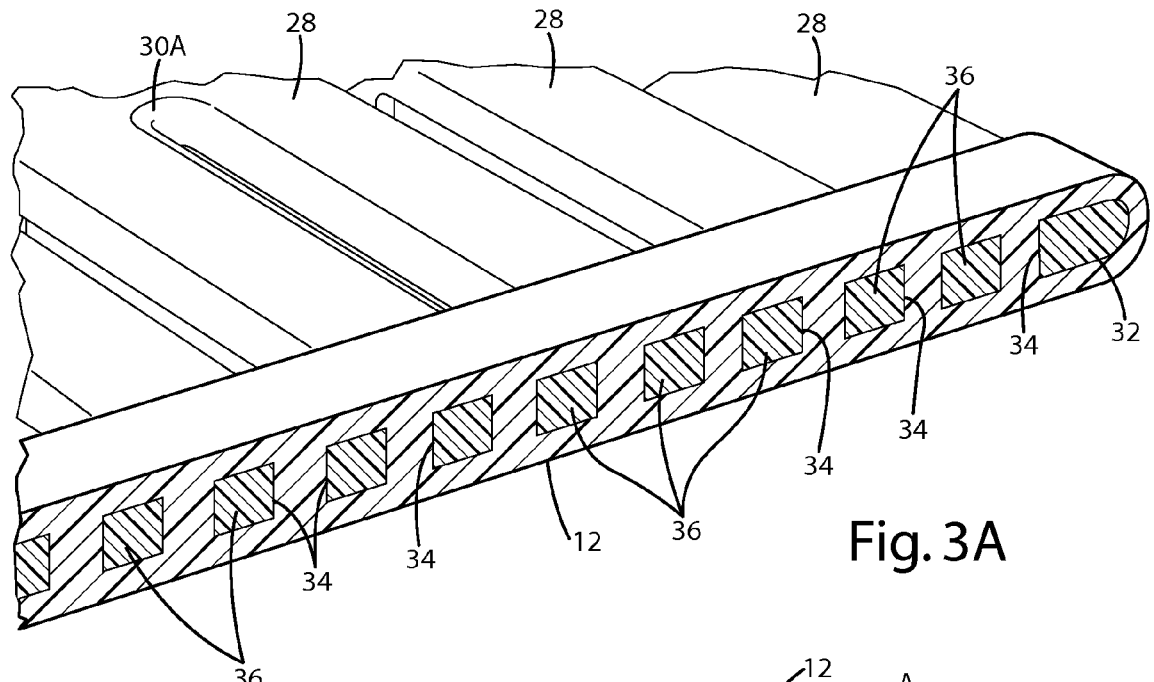
FIG. 3A is a cross-sectional view of the load bearing surface showing the interrelationship between the load bearing surface and the orienting member.

In the illustrated embodiment, the projection 32 is encapsulated in the load bearing surface 12. The projection 32 includes a plurality of apertures 34 through which the material of the load bearing surface 12 extends to mechanically knit the load bearing surface 12 and the orienting member 14. In the illustrated embodiment, the apertures 34 extend through the projection 32 in a direction generally perpendicular to the direction of the tensile loads to be encountered by load bearing surface assembly 10 during orientation and/or in final use as load bearing surface. The orientation of the apertures 34 may vary from application to application. The apertures 34 of the illustrated embodiment are generally square in cross-section, thereby providing a surface that extends along a plane that is generally perpendicular to the direction of the tensile loads (See FIG. 3A). The apertures 34 may vary from application to application, as desired. For example, the apertures may be rectangular in cross-section and still provide a surface that extends along a plane extending generally perpendicular to the direction of the tensile loads. In other applications, the apertures may be shaped in a way that does not provide a surface extending through a plane generally perpendicular to the direction of the tensile loads. The apertures may vary in cross-sectional shape along their length.

Figure 3B:
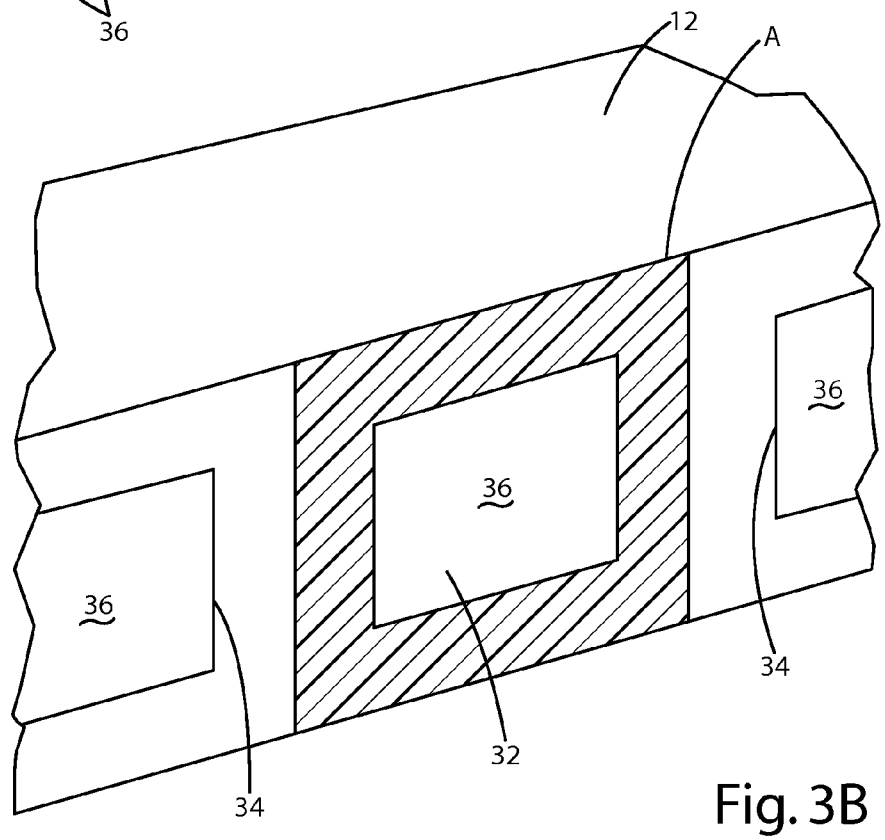
FIG. 3B is an enlarged cross-sectional view of a portion the load bearing surface showing the interrelationship between the load bearing surface and the orienting member.

In the illustrated embodiment, the area of the load bearing surface material and the area of the projection are substantially equal. More specifically, when viewed in cross-section (see FIG. 3B), the area of each projection segment 36 is roughly equal to the total area of load bearing surface material above, below and along each side of the segment 36 (as represented by cross-hatched region A in FIG. 3B). In determining this rough equivalence, the area extending to a point approximately mid-way between adjacent segments 36 is considered.

Manufacture of the load bearing surface assembly 10 is described in connection with FIGS. 4-7. The orienting members 14, 16 are pre-manufactured. For example, the orienting members 14, 16 may be injected molded using a conventional injection molding techniques and apparatus. The apertures 34 may be formed during the molding process or may be added to the orienting members 14, 16 in a subsequent manufacturing step. The orienting members 14, 16 may be manufactured from a wide variety of materials having sufficient hardness to withstand the forces to be encountered in the orienting process. In the illustrated embodiment, the orienting members 14, 16 are manufactured from a plastic material having a hardness that is an order of magnitude greater than the hardness of the load bearing surface 12. However, the orienting members 14, 16 need not be manufactured from plastic, but rather may be any material of hardness sufficient to withstand the forces encountered during the orienting process. The specific hardness may vary from application to application depending in large part on the characteristics of the load bearing surface material and the amount of elongation to be achieved during the orienting process.

Figure 4:
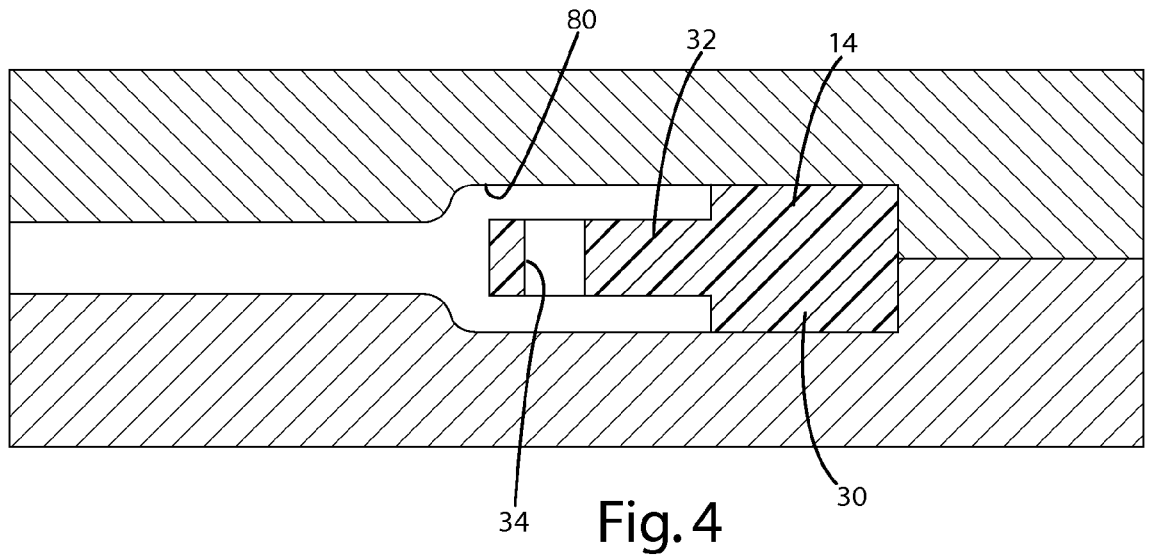
FIG. 4 is a cross sectional view of a mold showing the orienting member in the mold cavity before injection of the load bearing surface material.
Figure 5:
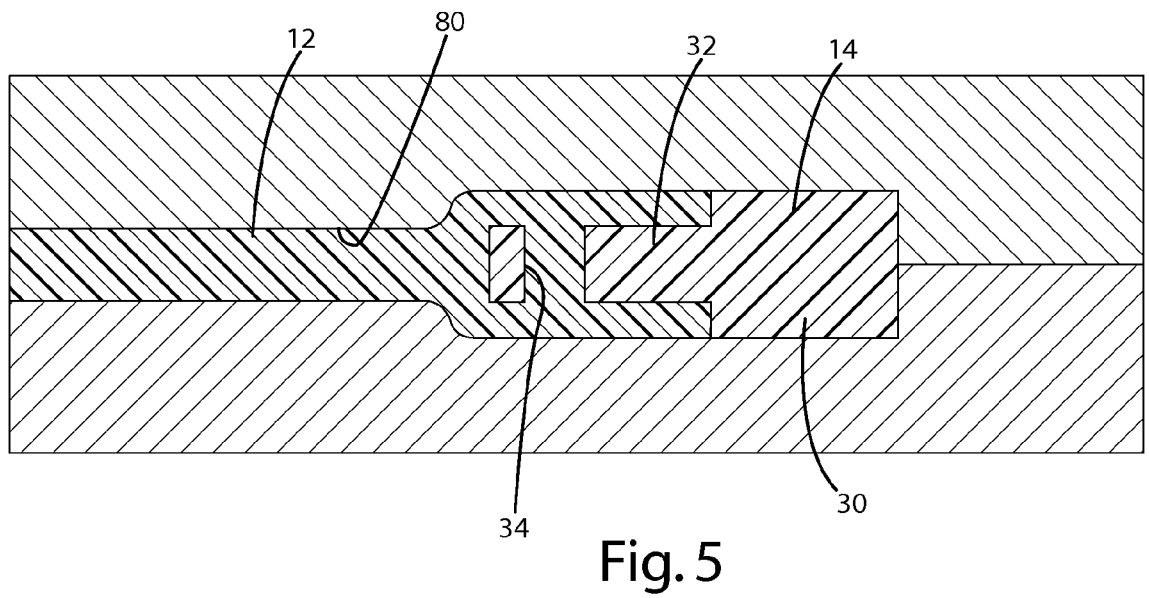
FIG. 5 is a cross sectional view of a mold showing the orienting member in the mold cavity after injection of the load bearing surface material.

Referring now to FIG. 4, the orienting members 14, 16 are placed in the mold cavity 80 for the load bearing surface 12. In the illustrated embodiment, the orienting members 14, 16 are disposed at opposed ends of the mold cavity 80. The orienting members 14, 16 are positioned with their respective projections 32 cantilevered into the mold cavity 80. The mold cavity 80 may be shaped so that when it is fully closed it firmly holds the orienting members 14, 16 in the appropriate position.

The load bearing surface 12 is next molded in place onto the orienting members 14, 16. The material of the load bearing surface 12 is introduced into the mold cavity 80, which in the illustrated embodiment may be achieved using conventional molding techniques and apparatus. The load bearing surface material in this embodiment may be a thermoplastic elastomer, such COPE (copolymer polyester), nylon-based TPE or a thermoplastic urethane. The introduced material flows through and substantially fills the mold cavity 80. In doing so, the material flows through the apertures 34 in the orienting members 14, 16, which is perhaps best shown in FIG. 5. The material is held in the mold until it is sufficiently cured. Once cured, the load bearing surface 12 and the orienting members 14, 16 are mechanically knitted together forming a load bearing surface assembly 10 that is essentially a unitary structure. In some applications, there may also be an adhesive bond between the load bearing surface 12 and the orienting members 14, 16.

Figure 6:
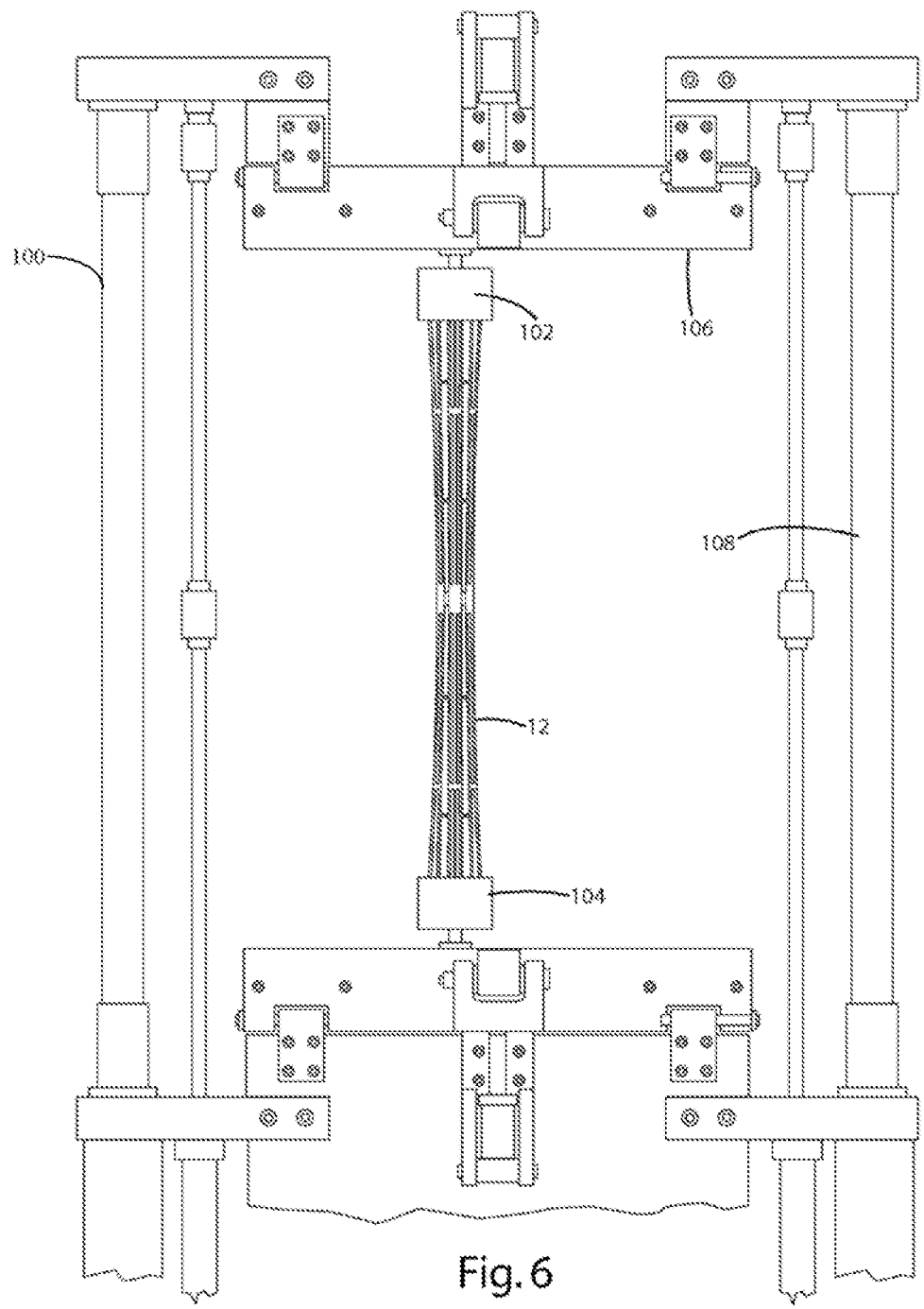
FIG. 6 is a front view of an orienting apparatus in the process of orienting.
Figure 7:
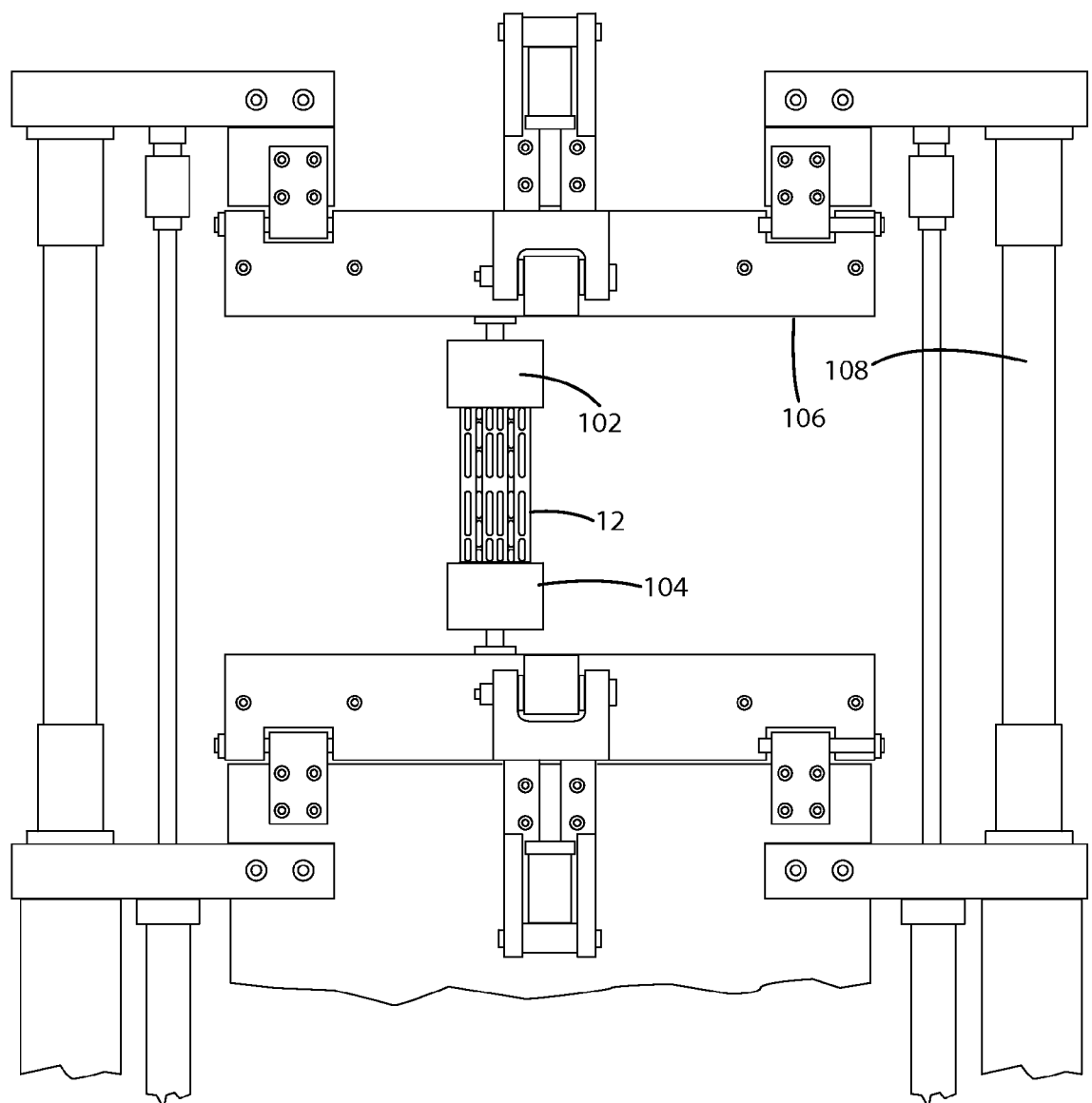
FIG. 7 is a front view of an orienting apparatus.

Once the load bearing surface assembly 10 is formed, the load bearing surface 12 is oriented to give it the desired physical characteristics. For example, the load bearing surface 12 may be intentionally and permanently deformed in the direction along which the principle tensile loads will run during use. By doing this prior to actual use, undesired deformation (or creep) that might otherwise occur from loading during use can be limited and potentially avoided altogether. In anticipation of orienting, the load bearing surface 12 is intentionally designed smaller than it's "in use" size by the amount it will be enlarged by the permanent deformation brought on by the orienting process. In effect, the orienting process forces the creep to occur in large part prior to actual use instead of during use of the load bearing surface assembly 10. Forcing this creep to occur in the manufacturing environment allows it to happen in a controlled and repeatable manner. The load bearing surface assembly 10 shown in FIGS. 1-5 may be manufactured using essentially any type of orienting apparatus capable of gripping the orienting members and applying the desired stretch to the load bearing surface. FIGS. 6 and 7 show an orienting apparatus 100 capable of orienting the load bearing surface assembly 10 shown in FIGS. 1-5. The orienting apparatus 100 generally includes a pair of clamps 102, 104 that may be closed on the orienting members 14, 16. The clamps 102, 104 may include jaws that are shaped to mate with the orienting members 14, 16. For example, the orienting members 14, 16 may include protrusions or other surface contours that provide a strong interconnection with the clamps 102, 104. The jaws of the clamps 102, 104 may be held in the closed position by bolts or other fasteners, if desired. In the illustrated embodiment, the upper clamp 102 is movably mounted to the orienting apparatus so that the distance between the two clamps 102, 104 may be varied. The movable clamp 102 may be mounted on a carriage 106 that is connected to a hydraulic cylinder (not identified) or other mechanism capable of providing the carriage 106 with linear motion. Extension and retraction of the cylinder 108 may be used to move the carriage 106 and consequently the movable clamp 102 (compare FIGS. 6 and 7). The amount of stretch applied to the load bearing surface may vary from application to application. However, in the illustrated embodiment, the load bearing surface 10 may be stretched in the range of approximately twice to approximately six times its original length.

Once included in the load bearing surface assembly 10, the orienting members 14, 16 may be used to mount the load bearing surface assembly 10 to a support structure (not shown). For example, the orienting members 14, 16 may be secured to a support frame (not shown) by fasteners (not shown). The support frame may be a peripheral structure. If desired, the orienting members 14, 16 may include holes or other fastener details that facilitate mating of the orienting members 14, 16 with the orienting apparatus 100 and/or facilitate mounting of the load bearing surface assembly 10 to a support structure in its end use.

As noted above, the load bearing surface assembly 10 of the illustrated generally includes a load bearing surface 12 and a pair of orienting members 14, 16. Although shown with a pair of orienting members 14, 16, the number of orienting members may vary from application to application depending in large part on the design and configuration of the load bearing surface 12, the support structure (not shown) and the orienting apparatus (not shown). In some applications, a load bearing surface assembly 10 may include only a single orienting member, while in others the number of orienting members may be as large as desired. In the illustrated embodiment, the pair of orienting members 14, 16 are used to orient the load bearing surface 12 and to mount the load bearing surface assembly 10 to a support structure. It is not necessary for all of the orienting members in a single load bearing surface assembly to perform both functions. For example, in other applications, any given orienting member in a load bearing surface assembly may be used for orienting, for mounting or for both purposes.

Figure 8A:
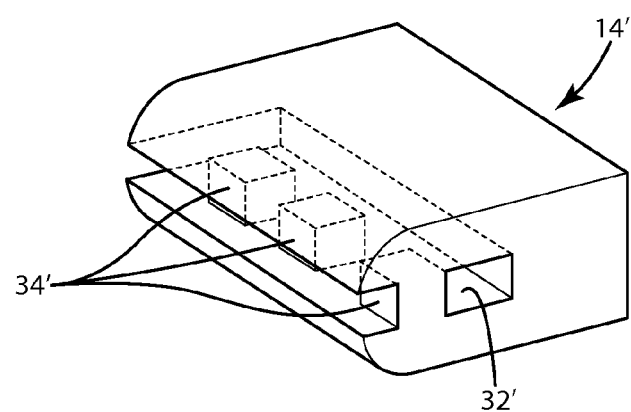
FIG. 8A is a perspective view of a portion of an alternative orienting member.
Figure 8B:
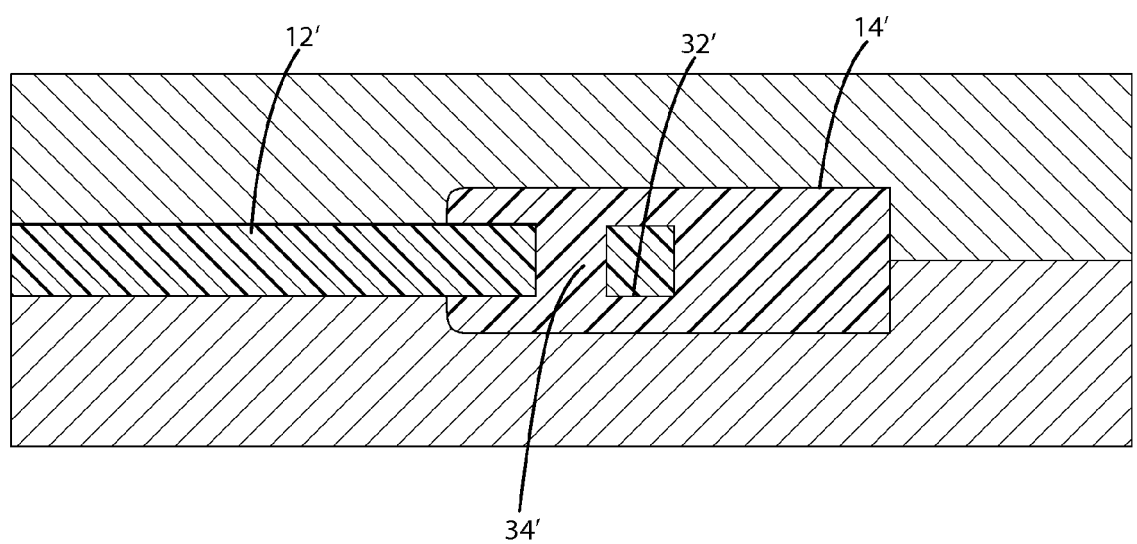
FIG. 8B is a cross sectional view of a mold showing the alternative orienting member of FIG. 8A in the mold cavity after injection of the load bearing surface material.

In the illustrated embodiment, the load bearing surface 12 and the orienting members 14, 16 are mechanically knitted by the flow of load bearing surface material through apertures 34 in the projection 32. These components can be interconnected using alternative mechanical structures. For example, as shown in FIGS. 8A and 8B, the orienting member 14' may define a channel 32' and include a plurality of posts 34' that extend across the channel 32'. The size, shape, spacing and configuration of the posts may vary from application to application. In use, the posts 34' are entrapped by the flow of load bearing surface material 12' during the molding process, as shown by FIG. 8B.

Figure 9:
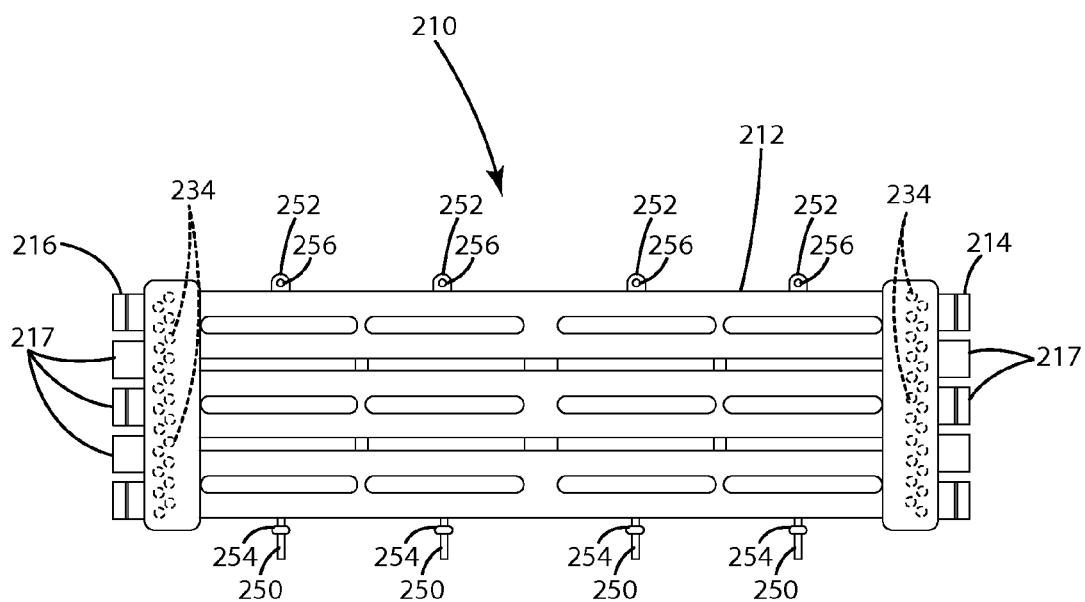
FIG. 9 is a top plan view of an alternative load bearing surface.
Figure 10A:
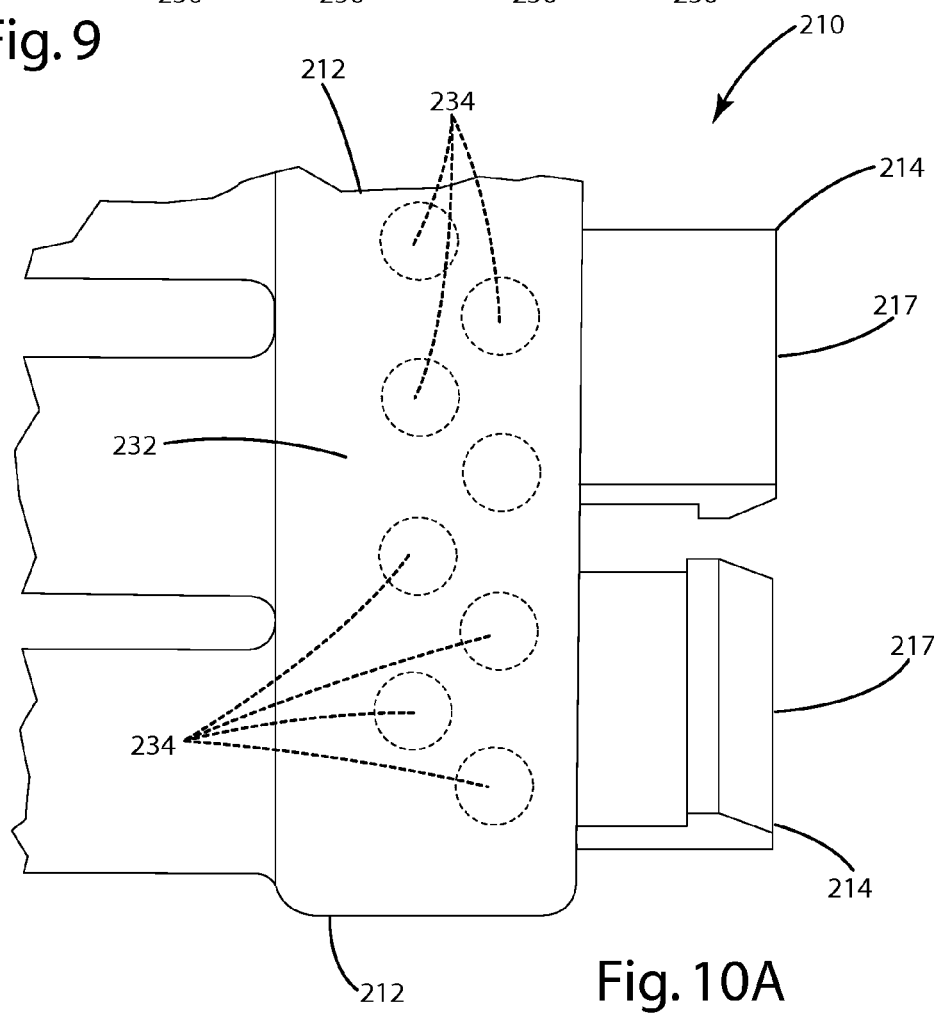
FIG. 10A is an enlarged view of a portion of the alternative load bearing surface of FIG. 9.
Figure 10B:
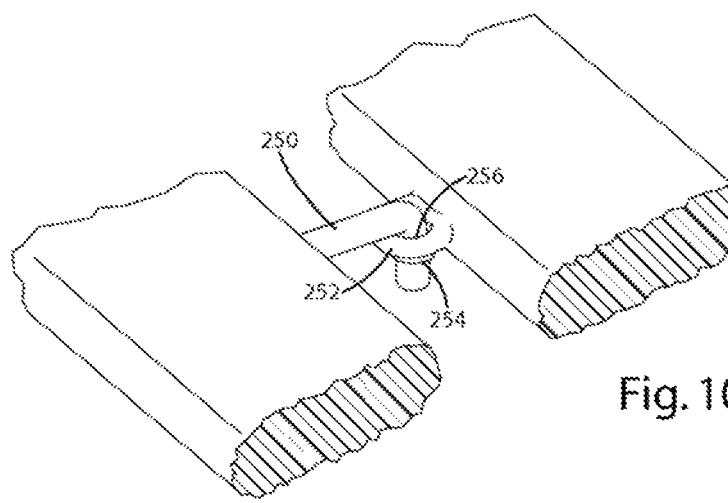
FIG. 10B is an enlarged view of a portion of the alternative load bearing surface of FIG. 9 showing the connectors joined.

An alternative load bearing surface assembly 210 is shown in FIGS. 9 and 10A-B. In this embodiment, the orienting members 214, 216 include integral attachment features. More specifically, the orienting members 214, 216 include tabs 217. The tabs 217 may be "barbed" so that they may be snap-fitted into corresponding openings in a support structure (not shown). The orienting apparatus may also include contours that closely interfit with the tabs 217. For example, the orienting apparatus may include jaws that close on the tabs 217. The jaws may be contoured to match the shape of the tabs 217. FIGS. 9 and 10A show the apertures 234 in the orienting member 214 in hidden lines. As shown, the apertures 234 are generally circular in cross-section and are arranged in two offset rows along the projection 232 of the orienting member 214. The apertures 234 could vary in size, spacing, arrangement and cross-sectional shape from application to application.

It may be desirable to combine a plurality of load bearing surface assemblies to provide a larger support structure. For example, two or more load bearing surface assemblies may be positioned adjacent to one another to cooperatively provide a larger support surface (See e.g. FIG. 16). It may be desirable in some applications to interconnect adjacent load bearing surfaces. Among other things, this may help to prevent the two load bearing surface assemblies from separating under a load and may give the two assemblies some interdependency in terms of support and movement. The embodiment of FIGS. 9 and 10 includes integral attachments for intersecuring adjacent load bearing surface assemblies. More specifically, a load bearing surface assembly 210 of this embodiment may include four male connectors 250 and four female connectors 252. The male connector 250 includes a head 254 and the female connector 252 defines an aperture 256. In use, the male connectors 250 of one load bearing surface assembly 210 can be interfitted with the corresponding female connectors 252 of an adjacent load bearing surface assembly 210 to join the two assemblies. For example, FIG. 10B shows a male connector 250 of one assembly 210 fitted through the opening in the female connector 252 of another assembly 210. During assembly, the male connectors 250 are pulled through the apertures 256 in the female connectors 252 until the heads 254 pass through the aperture 256 to lock the connectors 250, 252 together. The connectors 250, 252 may be of various configurations depending on a variety factors, such as the desired characteristics of the load bearing surface assembly, the desired tension in the connectors, the amount of force desired for joining the connectors, the amount of force desired to separate the connectors once attached and the amount of elasticity and interdependence desired between adjacent load bearing surface assemblies. The design and configuration of the connectors of load bearing surface assembly 210 is merely exemplary. The number, size, shape and configuration of the connectors may vary from application to application as desired. For example, the connectors need not be evenly spaced and need not be identical to one another. Further, it is not necessary for all of the male connectors to be on one side and all of the female connectors to be on the other. Rather, they may be comingled as desired provided that a matching arrangement is used on the opposite side. In the illustrated embodiment, the connectors are not oriented, but it should be understood that they can be oriented if desired.

Figure 11:
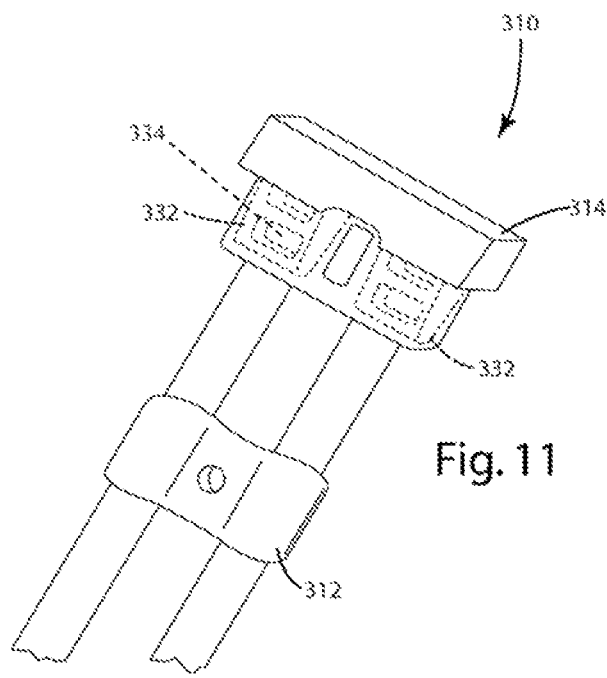
FIG. 11 is a representational view of a second alternative embodiment.

A second alternative embodiment of the load bearing surface assembly 310 is shown in FIG. 11. In this embodiment, the orienting member 314 includes two projections 332. The projections 332 each define a plurality of apertures 334. The load bearing surface 312 is molded in place on the projections 332, thereby providing a unitary assembly.

Figure 12:
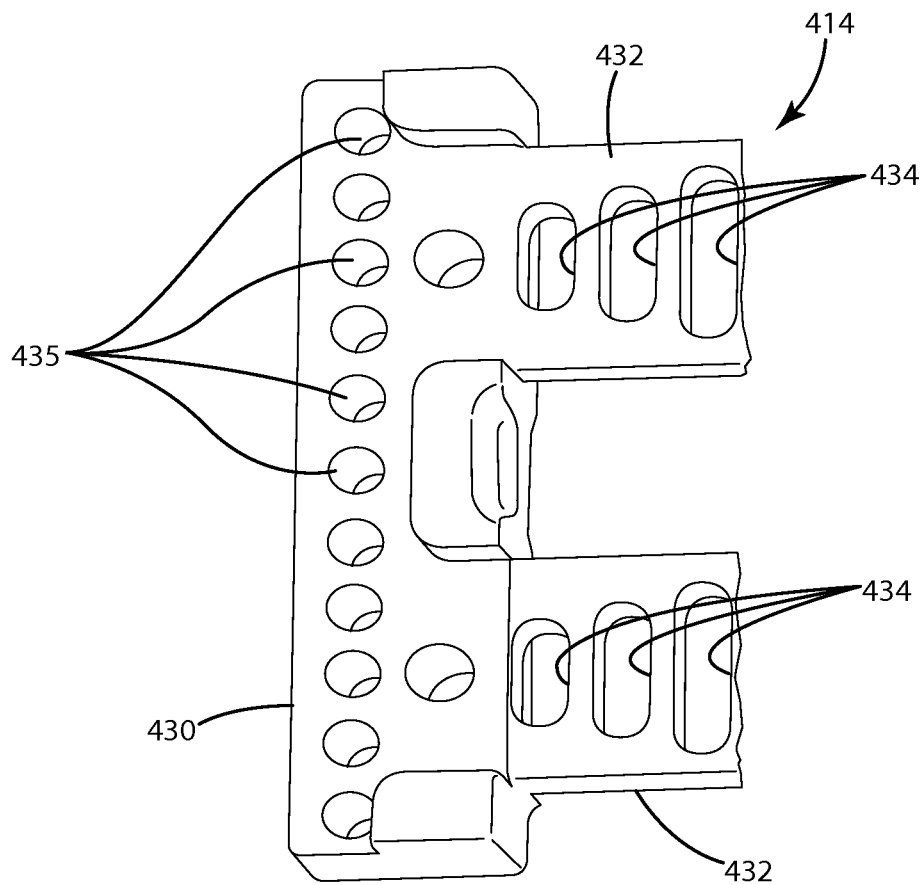
FIG. 12 is a perspective view of an orienting member of a third alternative embodiment.

FIG. 12 shows another alternative orienting member 414. In this embodiment, the orienting member 414 includes two projections 432, and each projection 432 defines three apertures 434. Additionally, the head 430 of the orienting member 414 defines a plurality of apertures 435. In this embodiment, the head 430 and projections 432 may be exposed within the mold cavity so that the material of the load bearing surface flows through and mechanically interlocks with the head 430 and the projections 432.

Figure 13:
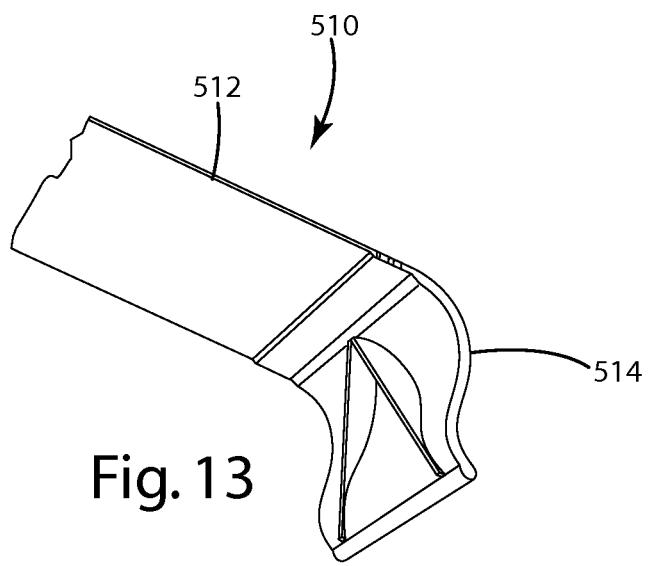
FIG. 13 is a perspective view of a fourth alternative embodiment.
Figure 14:
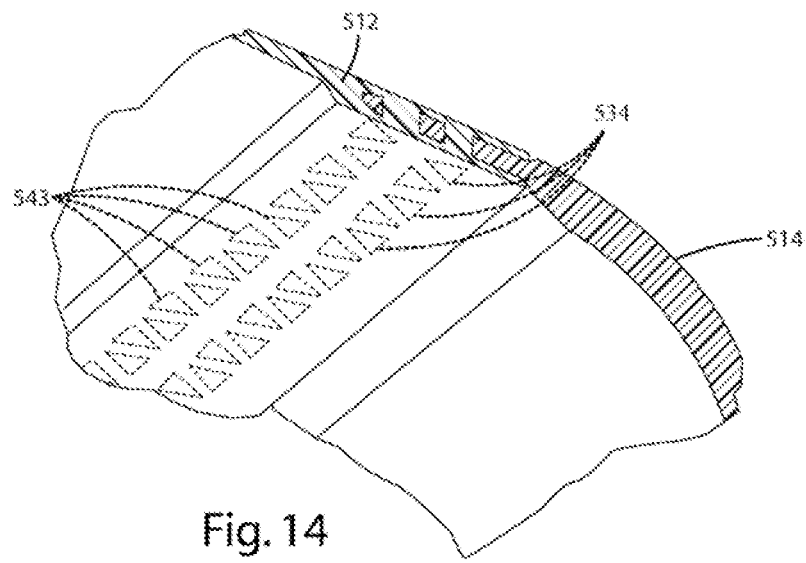
FIG. 14 is an enlarged perspective view of a portion of the fourth alternative embodiment.
Figure 15:
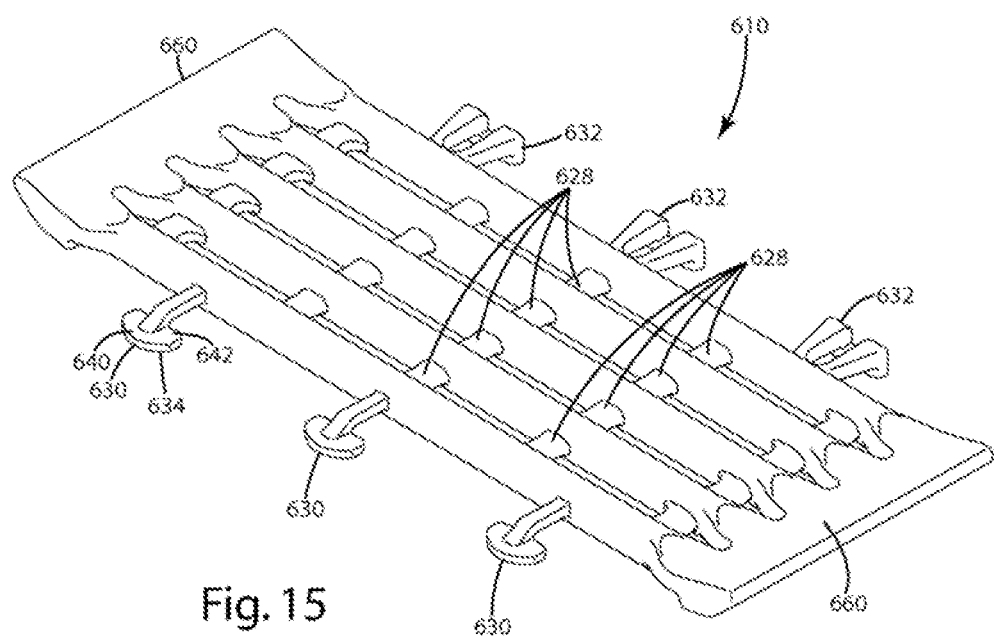
FIG. 15 is a perspective view of a fifth alternative embodiment.

In some applications, the orienting members may be mounted to a support structure without a separate support frame. For example, as shown in FIGS. 13 and 14 the load bearing surface assembly 510 may include orienting members 514 (only one shown) that are designed to function as a chair seat or chair back frame. In this embodiment, the orienting members 514 are contoured to provide the desired aesthetic appearance and are configured to mount directly to the underlying support structure without a separate frame. For example, the orienting members 514 may be positioned along the left and right ends of the load bearing surface assembly 510. The orienting members 514 may be mounted to support structures extending along the left and right sides of the chair to provide a suspended seat structure. This embodiment eliminates the use of a separate peripheral frame to support the load bearing surface assembly 510 and may therefore reduce cost in some applications. The load bearing surface material 512 shows the apertures 534 in the orienting member 514 in hidden lines. As shown, the apertures 534 are generally triangular in cross-section and are arranged in two rows. The apertures 534 could vary in size, spacing, arrangement and cross-sectional shape from application to application.

A fourth alternative embodiment is shown in FIGS. 15-18. This embodiment is similar to the embodiment of FIGS. 9 and 10A-B in that the load bearing surface assemblies (See FIG. 15) can be used in modular applications where it is desirable to combine a plurality of load bearing surfaces to provide a larger support surface (See FIG. 16). In this embodiment, each load bearing surface assembly 610 includes three sets of integral connectors 630 and 632. More specifically, in this embodiment, each load bearing surface assembly 610 includes three male connectors 630 extending from one side of the load bearing surface assembly 610 and three female connectors 632 extending from the opposite side. The connectors may or may not be aligned with bridges 628 extending laterally across the load bearing surface assembly depending in part on the desired support characteristics of the overall surface. For example, in the embodiment of FIGS. 15-18, the central set of connectors is aligned with bridges 628 extending laterally across the load bearing surface assembly, while the other two sets of connectors are not.

Figure 16:
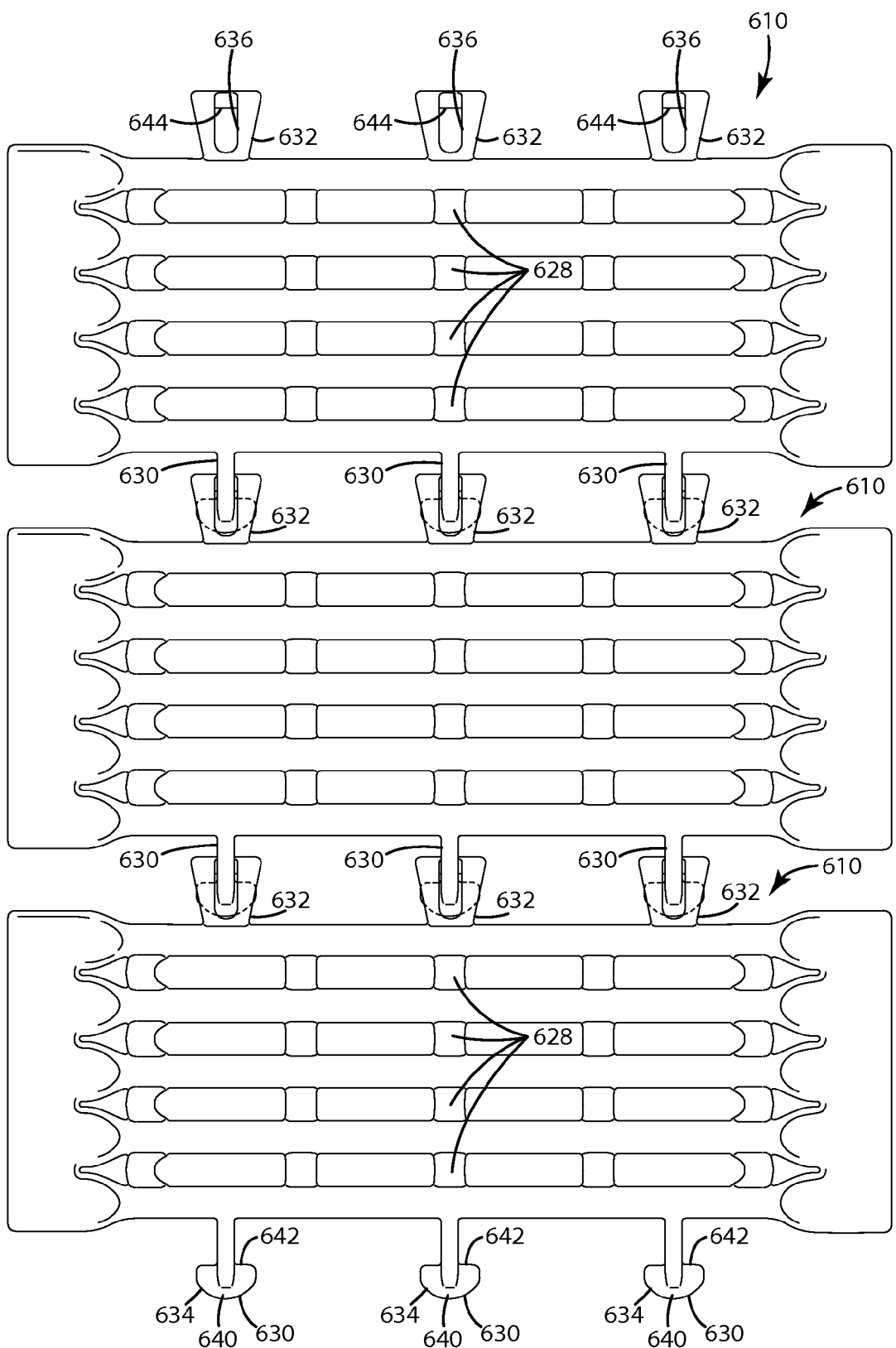
FIG. 16 is a top plan view of a plurality of interconnected load bearing surface assemblies.

FIG. 16 shows three load bearing surface assemblies 610 joined together by the connectors. In this embodiment, the male connectors of one load bearing surface assembly are interfitted with the corresponding female connectors of the adjacent load bearing surface assembly. Although FIG. 16 shows three assemblies joined together, the number of interconnected load bearing surface assemblies 610 may differ from application to application. For example, in some applications only two load bearing surface assemblies may be joined together and in other applications more than three load bearing surface assemblies may be ganged together.

Figure 17A:
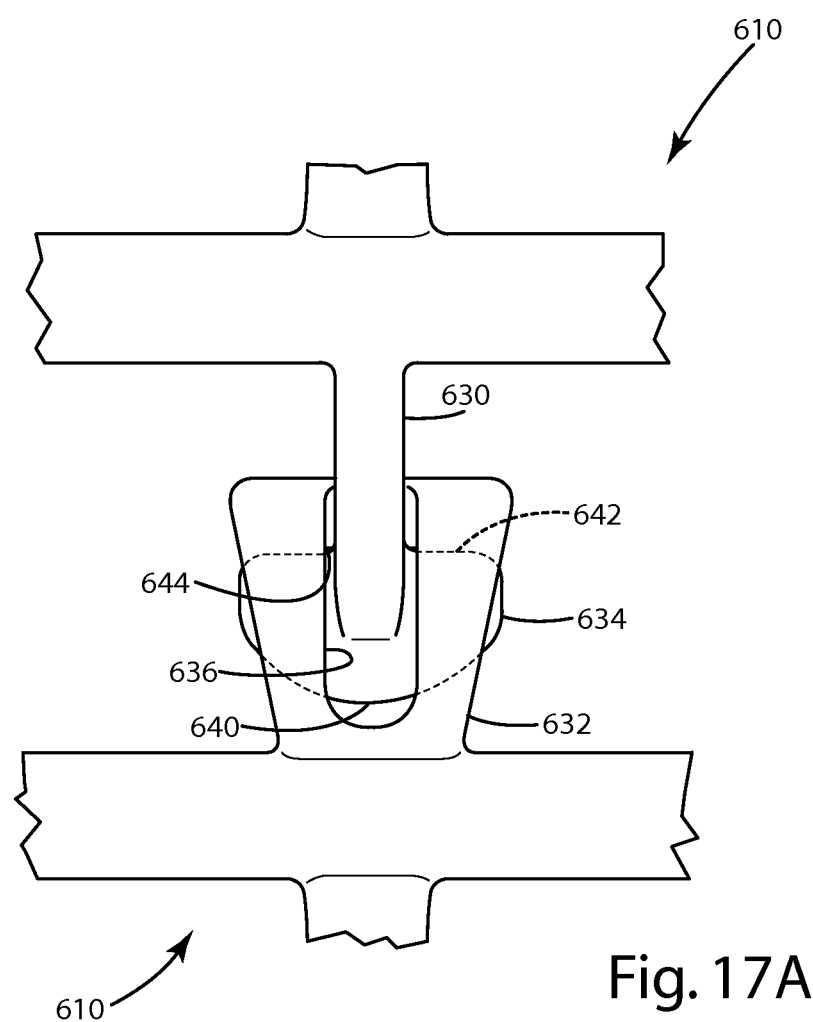
FIG. 17A is a top plan view of an enlarged portion of the interconnected load bearing surface assemblies.
Figure 17B:
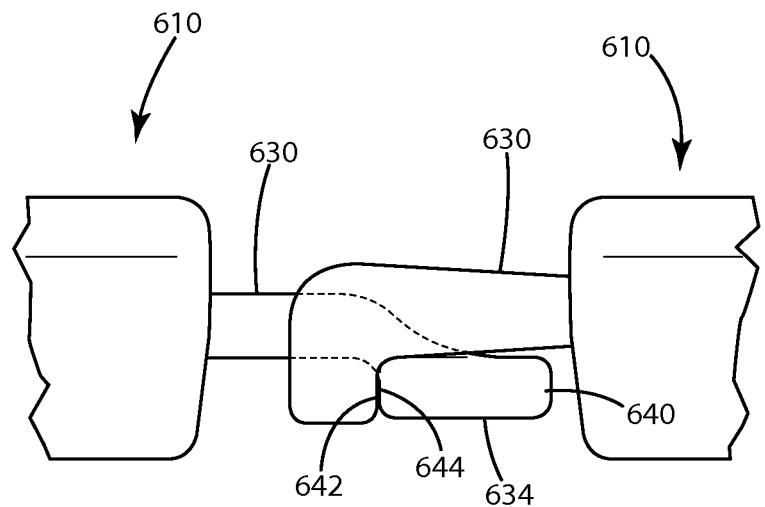
FIG. 17B is a side elevational view of an enlarged portion of the interconnected load bearing surface assemblies.

As noted above, the design and configuration of the connectors may vary from application to application. However, in the illustrated embodiment, each male connector 630 may include a head 634 with a tapered nose 640 and a flat tail 642, and each female connector 632 may define an aperture 636 shaped to receive the head 634 (See FIG. 15). The tapered nose 640 may facilitate insertion of the head 634 into the aperture 636 of the female connector 632. The surfaces of the female connector that define the aperture 636 may include a shoulder 644 shaped to seat the tail 642 of the head 634 (See FIG. 17A). The interface between the flat tail 642 and the shoulder 644 may be configured to resist separation of the head 634 from the female connector 632. If desired, the interfacing surfaces of the tail 642 and/or the shoulder 644 may be angled inwardly to draw together opposite sides of the female connector 632 when forces tending to pull apart the two load bearing surface assemblies are encountered. As shown in FIG. 17B, this embodiment may provide the connectors 630 and 632 with a relatively flat profile that does not exceed the thickness of the main portion of the load bearing surface assembly. Accordingly, the connectors need not increase the space required to accommodate the load bearing surface assemblies and may not be felt by a user seated or otherwise supported on the surface.

Figure 18:
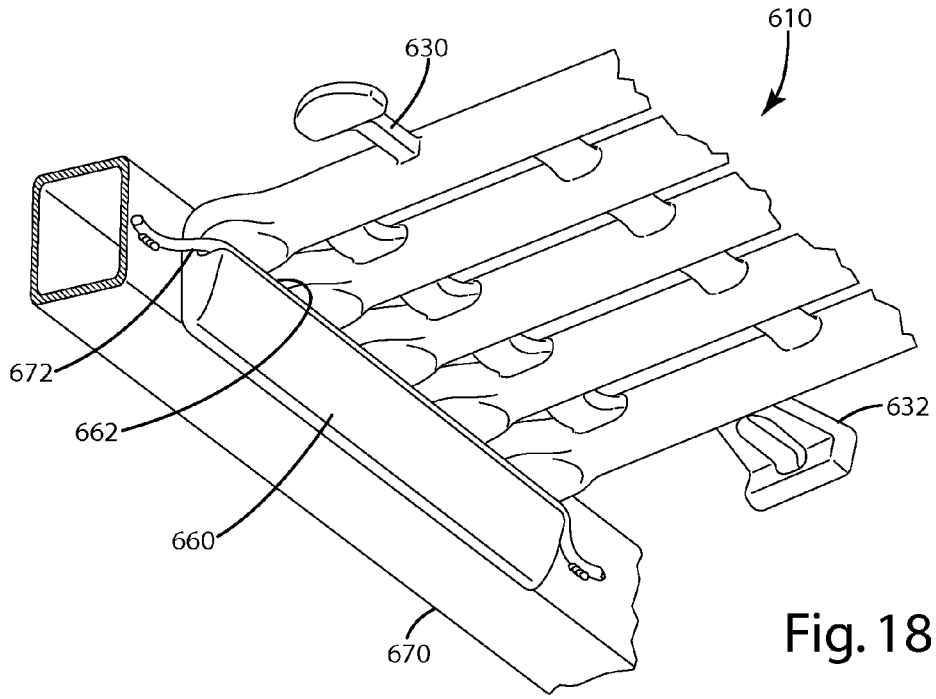
FIG. 18 is a perspective view showing the fifth alternative embodiment mounted to a frame.

A load bearing surface assembly with integral connectors may benefit from also including integral orienting members as discussed above in connection with the embodiments of FIGS. 1-14. However, a load bearing surface assembly need not include integral orienting members to within the scope of this aspect of the invention. For example, the embodiment of FIGS. 15-18 does not include integral orienting members. Instead, it includes an integral attachment edges that can be fitted into a frame or other structural member. FIG. 18 shows one end of the load bearing surface assembly 610 mounted to a frame 670. The opposite end may be mounted in a like manner. The size of the load bearing surface assembly 610 and the spacing between opposite sides of the frame 670 may be selected to place the assembly 610 under the desired tension. For example, it may be desirable to preload the load bearing surface assembly 610 so that it provides the desired support and cushioning characteristics. When smaller than the distance between opposite frames 670, the load bearing surface assembly 610 is stretched for installation on the frame 670 and is held in a stretched condition once installed. Referring now to FIG. 18, opposite edges 660 of the load bearing surface assembly 610 may be formed with integral attachment details 662. The edges 660 of the illustrated embodiment are used for mounting by turning the edges 660 in a direction perpendicular to the primary extent of the load bearing surface assembly 610 and fitting them into corresponding slots 670 in opposite frames 672 (or other structural member). Tension in the load bearing surface assembly may be used to help retain the attachment details 662 in the slots 670. Additionally (or in the alternative), fasteners (such as screws) may be used to secure the edge to the frame or other structural member.

Figure 19:
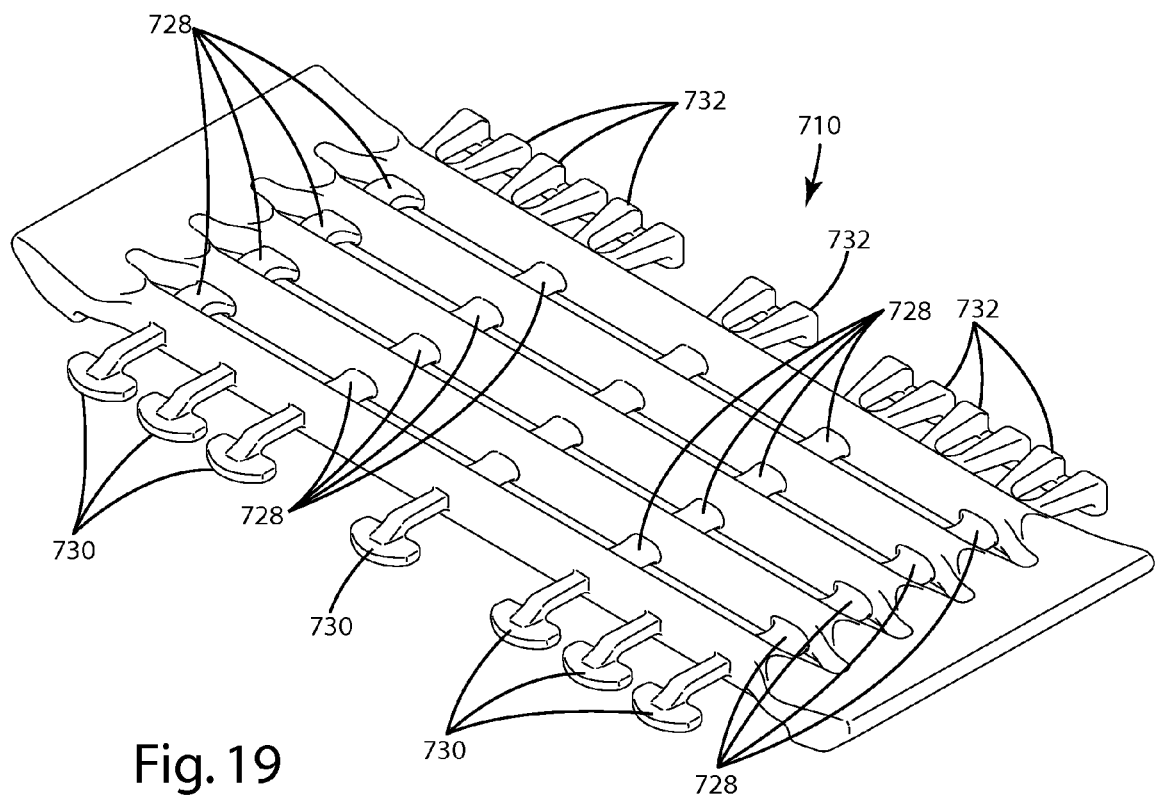
FIG. 19 is a perspective view of a sixth alternative embodiment.

Although the FIGS. 15-18 show an embodiment with three sets of connectors spaced evenly along opposite edges of the load bearing surface assembly, that construction is merely exemplary. The number and spacing of connectors may vary depending on a variety of factors, including anticipated load and desired support characteristics. For example, as shown in FIG. 19, the load bearing surface assembly 710 may include seven sets of connectors, each set including a male connector 730 and a female connector 732. The connectors are arranged with one set of connectors in the middle of the assembly and three sets of connectors grouped together toward opposite ends of the assembly. In this embodiment, five sets of connectors are aligned with bridges 728 extending across the load bearing surface assembly 710 and two sets of connectors are not.

Adjacent load bearing surface assemblies may be joined using essentially any assembly equipment capable of interfitting the male and female connectors. In some applications, this may be done manually. In one embodiment, the assembly machine (not shown) includes fixtures that hold adjacent load bearing surface assemblies. The fixtures may hold the entire assemblies or may hold only portions of the assemblies. For example, the fixtures may hold only the connectors that are being joined. In this embodiment, the fixtures hold the parts so that the male and female connectors overlap. The assembly machine includes a mandrel or other similar component that applies force to the male and female connectors in a direction perpendicular to extent of the load bearing surface assembly. A sufficient amount of force is applied to cause the male and female connectors to snap into engagement. With regard to the load bearing surface assembly 710, the mandrel will force the head of the male connector through the aperture in the female connector. In another embodiment, the male and female connectors are joined after the load bearing surface assemblies have been installed on the frame (or other support structure). In this embodiment, the frame essentially functions as the fixture for holding the load bearing surface assemblies in position while a mandrel or other similar component applies the perpendicular force required to join the connectors. The apparatus and methods used to join the connectors may vary from application to application depending in part on the design and configuration of the connectors.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A load bearing surface assembly, comprising:
    a molded, oriented load bearing surface, said load bearing surface having elastomeric properties allowing said load bearing surface to flex under anticipated loads, the load bearing surface being deformed in a predetermined direction; and
    at least one orienting member, said load bearing surface being molded onto said orienting member, said orienting member having a hardness greater than a hardness of said load bearing surface and being sufficiently rigid to provide a structural component for at least one of gripping said load bearing surface assembly during orienting of said load bearing surface and mounting said load bearing surface assembly to a support structure.

2. The assembly of claim 1 including at least a first orienting member and a second orienting member.

3. The assembly of claim 2 wherein said load bearing surface includes a pair of opposed edges;
    said load bearing surface being molded onto said first orienting member at a first of said opposed edges; and
    said load bearing surface being molded onto said second orienting member at a second of said opposed edges.

4. The assembly of claim 1 wherein said orienting member includes an interlocking feature to provide a mechanical interlock between said load bearing surface and said orienting member.

5. The assembly of claim 4 wherein said interlocking feature is further defined as a plurality of apertures defined through said orienting member in a direction substantially perpendicular to a direction of anticipated tensile loads on said load bearing surface during use of said assembly, said apertures having a cumulative cross-sectional area approximately equal to or greater than a total of anticipated maximum tensile loads multiplied by a shear strength of a material used to form said load bearing surface.

6. A load bearing surface assembly, comprising:
    a molded, oriented load bearing surface, said load bearing surface having elastomeric properties allowing said load bearing surface to flex under anticipated loads; and
    at least one orienting member interconnected with said load bearing surface, said orienting member being sufficiently rigid to provide a structural component for at least one of gripping said load bearing surface assembly during orienting of said load bearing surface and mounting said load bearing surface assembly to a support structure,
    wherein said load bearing surface includes integral connectors, said integral connectors configured to allow interconnection between adjacent load bearing surface assemblies.

7. A method for manufacturing a load bearing surface, comprising the steps of:
    providing an orienting member;
    placing the orienting member in a mold cavity;
    molding a load bearing surface onto the orienting member to form a unitary structure; and
    orienting the molded load bearing surface by deforming the load bearing surface in a predetermined direction using an orienting apparatus capable of elongating the load bearing surface, the orienting apparatus mating with and using the orienting member to elongate the load bearing surface.

8. The method of claim 7 further including the steps of:
    providing a second orienting member; and
    placing the second orienting member in the mold cavity;
    wherein said molding step is further defined as molding a load bearing surface onto the first orienting member and the second orienting member to form a unitary structure; and
    wherein said orienting step is further defined as orienting the molded load bearing surface using an orienting apparatus capable of elongating the load bearing surface, the orienting apparatus mating with and using the first orienting member and the second orienting member to elongate the load bearing surface.

9. The method of claim 8 wherein the mold cavity is shaped to define the load bearing surface with a pair of opposed edges; and wherein said first placing step is further defined as placing the first orienting member in the mold cavity along a first of the opposed edges; and wherein said second placing step is further defined as placing the second orienting member in the mold cavity along a second of the opposed edges.

10. The method of claim 9 wherein said orienting step is further defined as orienting the molded load bearing surface using an orienting apparatus capable of elongating the load bearing surface, the orienting apparatus mating solely with the first orienting member and the second orienting member, the orienting apparatus moving the first orienting member and the second orienting member apart to elongate the load bearing surface.

11. The method of claim 10 further including the step of mounting the load bearing assembly to a support structure, said mounting step including securing the first orienting member to the support structure and securing the second orienting member to the support structure, the first orienting member and the second orienting member being mounted apart from one another a distance determine to suspend the load bearing surface at a desired tension.

12. The method of claim 7 further including the step of mounting the load bearing assembly to a support structure, said mounting step including securing the orienting member to the support structure.

13. A method for manufacturing a load bearing surface, comprising the steps of:
providing an orienting member;
placing the orienting member in a mold cavity;
molding a load bearing surface onto the orienting member to form a unitary structure;
orienting the molded load bearing surface using an orienting apparatus capable of elongating the load bearing surface, the orienting apparatus mating with and using the orienting member to elongate the load bearing surface;
providing the load bearing surface with a set of integral connectors for joining adjacent load bearing assemblies, the set of integral connectors including a first connector on one side of the load bearing surface and a second connector on the opposite side of the load bearing surface, the first connector being configured to interconnect with the second connector; and
interconnecting a first load bearing surface assembly to a second load bearing surface assembly by interconnecting the first connector of the first load bearing surface assembly with the second connector of the second load bearing surface assembly.

14. A support assembly comprising:
a support structure;
a load bearing surface assembly mounted to said support structure, said load bearing surface assembly having a molded oriented load bearing surface and a pair of orienting members disposed along opposite edges of said load bearing surface, said molded oriented load bearing surface being molded onto said orienting members, said orienting members having a hardness greater than a hardness of said load bearing surface, said orienting members being secured to said support structure with said load bearing surface being held in suspension between said orienting members,
wherein the load bearing surface is deformed in a predetermined direction.

15. The support assembly of claim 14 wherein said load bearing surface has elastomeric properties allowing said load bearing surface to flex under loads anticipated during use; and
wherein said orienting members are sufficiently rigid to provide a structural component for mounting said load bearing surface assembly to a support structure.

16. The support assembly of claim 14 wherein said load bearing surface has elastomeric properties allowing said load bearing surface to flex under loads anticipated during use; and
wherein said orienting members are sufficiently rigid to provide a structural component for gripping said load bearing surface assembly during orienting and for mounting said load bearing surface assembly to a support structure.

17. The support assembly of claim 14 wherein each of said orienting members includes interlocking features to provide a mechanical interlock between said load bearing surface and said orienting member.

18. The support assembly of claim 14 wherein said load bearing surface assembly includes a cross section through said load bearing surface and one of said orienting members in which an area of said load bearing surface is substantially equal to an area of said interlocking features.

19. A support assembly, comprising:
a support structure; and
a load bearing surface assembly mounted to said support structure, said load bearing surface assembly having a molded oriented load bearing surface and a pair of orienting members disposed along opposite edges of said load bearing surface, said orienting members being secured to said support structure with said load bearing surface being held in suspension between said orienting members,
wherein said load bearing surface assembly includes a first connector on one side of said load bearing surface assembly and a second connector on an opposite side of side of said load bearing surface assembly, said first connector configured to interconnect with said second connector, whereby adjacent load bearing surface assemblies can be joined to one another by interconnecting a first connector and of one load bearing surface assembly with a second connector of another load bearing surface assembly.

* * * * *